D. F. BARCLAY.
Cheese-Vats.
No. 140,670.                                Patented July 8, 1873.
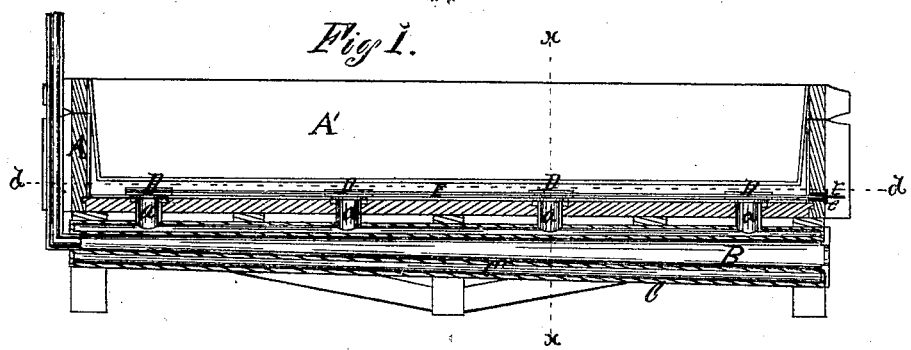
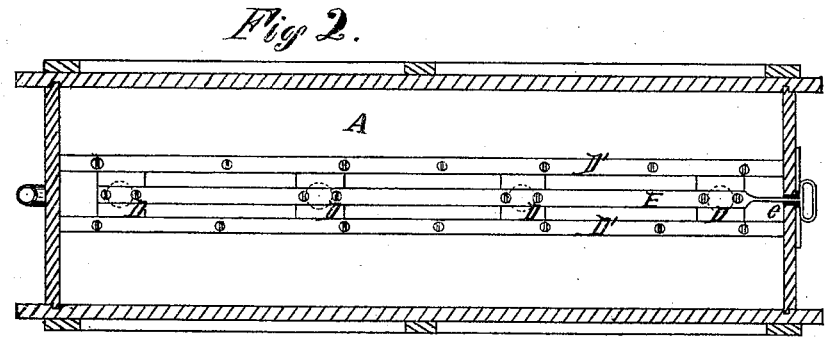
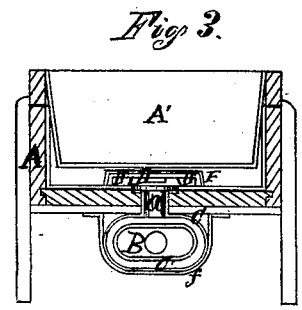
Witnesses                                   Inventor
                                            David F. Barclay

UNITED STATES PATENT OFFICE.

DAVID F. BARCLAY, OF ELGIN, ILLINOIS.

IMPROVEMENT IN CHEESE-VATS.

Specification forming part of Letters Patent No. 140,670, dated July 8, 1873; application filed April 26, 1873.

*To all whom it may concern:*

Be it known that I, DAVID F. BARCLAY, of Elgin, in the county of Kane and State of Illinois, have invented a new and useful Improvement in Cheese-Vats; and I do hereby declare the following to be a full, clear, and exact description thereof, which will enable others skilled in the art to which my invention appertains to make and use the same, reference being had to the accompanying drawing forming part of this specification, in which—

Figure 1 is a vertical longitudinal central section of a cheese-vat embodying my said improvement. Fig. 2 is a plan of the same, taken on the line $d\ d$, drawn across Fig. 1; and Fig. 3 is a vertical transverse section of the same, taken on the line $x\ x$, drawn through Fig. 1.

Similar letters of reference indicate like parts in the several figures of the drawing.

My invention relates to that class of cheese-vats in which the heater is attached to the lower surface of the same; and the improvement consists in providing the series of pipes communicating with the interior of the vat with a series of sliding valves, adapted to be opened or closed simultaneously; and also with a series of independent deflecting-plates, for distributing the heated water, whereby the requisite uniform temperature of the water in the vat may be obtained.

In the drawing, A represents the outer vat, and A' the inner vat, both of which are arranged in the usual manner, and therefore constitute no part of the present invention, and a description thereof is not necessary to be herein particularly given. B is the heater or fire-box, which is made of sheet metal, and in the form shown in Figs. 1 and 3. This heater is so arranged as to extend the entire length of the vat, and is inclosed within a jacket, C, made of like metal, and so arranged as to provide a water-chamber, C', between its inner side and the outer walls of the heater. This jacket is provided with a series of apertures, within which is secured pipes $a$, which extend upward through the lower surface or bottom of the outer vat A, as shown in Fig. 1, whereby the water within the outer vat is admitted through the said pipes into chamber C' and around the heater. D is a series of valves, which are secured within guides or ways D' D' permanently attached to the upper surface of the bottom of the outer vat. These valves are so arranged as to tightly close the aperture in the pipes $a$, and are so fitted between the guides or ways D' D' as to admit of a free and easy sliding movement. Permanently attached to the upper surface of the said valves is a connecting-rod, E, which passes through a stuffing-box, $e$, affixed within the end of the outer vat, by which means the respective valves are opened or closed. Firmly attached to the upper surface of the bottom of the outer vat, and immediately over the respective valves, are flat metal plates F, as shown in Fig. 3. These plates are so arranged as to allow the hot water, as it passes from chamber C' through the pipes $a$, to come in contact therewith, by which means the same is distributed evenly over the surface of the vat, the sides and ends of the respective plates being so arranged as to admit of the same. The heater is secured to the vat by means of a series of sheet-metal saddles, $f$, as shown in Fig. 3.

The manner of using my invention is as follows: The requisite amount of water is placed in the outer vat, in the ordinary manner; the valves are then opened, which allows the water to pass through the pipes into the chamber of the heater, and, as the same is heated, it passes upward through the pipes and against the respective plates, and is distributed throughout the vat; and when the temperature of the water in the vat has reached the proper degree the valves are again closed, thereby preventing the curd within the inner vat from becoming overheated.

It will be observed, by reference to the drawing, that the guides or ways extend the entire length of the vat, which may be as shown, or may be in sections, as found most advantageous.

Having thus described my invention, I claim—

The combination of the heater B, pipes $a\ a\ a\ a$, simultaneously-sliding valves D D D D, ways D' D', rod E, and distributing-plates F F F F, all constructed and arranged to operate substantially as and for the purpose specified.

DAVID F. BARCLAY.

Witnesses:
FRED. S. ORTON,
J. B. BUTLER.